Figure 1:

March 9, 1943.   J. E. STARECK   2,313,456
METHOD OF PRODUCING DECORATIVE COATINGS EXHIBITING
PATTERNS OR DESIGNS, AND PRODUCT
Filed June 19, 1939   3 Sheets-Sheet 1

Jesse E. Stareck
INVENTOR.

March 9, 1943. J. E. STARECK 2,313,456
METHOD OF PRODUCING DECORATIVE COATINGS EXHIBITING
PATTERNS OR DESIGNS, AND PRODUCT
Filed June 19, 1939 3 Sheets-Sheet 2

Jesse E. Stareck
INVENTOR.

Jesse E. Stareck
INVENTOR.

Patented Mar. 9, 1943

2,313,456

UNITED STATES PATENT OFFICE 2,313,456

METHOD OF PRODUCING DECORATIVE COATINGS EXHIBITING PATTERNS OR DESIGNS, AND PRODUCT

Jesse E. Stareck, Oakville, Conn., assignor to Kansas City Testing Laboratory, Kansas City, Mo., a corporation of Missouri Application June 19, 1939, Serial No. 279,953

14 Claims. (Cl. 204—23)

This invention relates to methods of producing decorative coatings exhibiting patterns or designs, and the products produced thereby.

I have discovered that decorative coatings exhibiting beautiful and unusual patterns or designs may be produced on articles by processes which are in whole or in part electro-chemical. I have also discovered ways of producing patterns or designs of various types or characters, and of controlling the reproducibility thereof. I have also discovered that in combination with various other coatings or deposits (electrolytic and otherwise) decorative coatings exhibiting patterns or designs in various metal, spectral, and pigment colors can be produced.

According to the present invention I form reducible coatings of adequate thickness on articles and reduce these electrolytically. After the electrolytic reduction, the articles, with the patterns or designs resulting from the treatment, may be used as they are, or they may serve as the base for other coatings, such as various metallic and non-metallic coatings, including lacquers. An article having a surface which appeals through the eye to the artistic or esthetic sense is produced.

The reducible coatings may be formed by oxidizing a metal, as copper, or by electrodepositing a reducible metal compound, as cuprous oxide. Copper, for example, may have an oxide coating formed thereon in the manner in which this is done in making rectifier and photosensitive devices. Reducible coatings such as cuprous oxide may be deposited according to the method disclosed in my Patent #2,081,121, May 18, 1937.

The reducible coatings should be of sufficient thickness so that after they are subjected to electrolytic reduction the pattern or design which is formed is clearly revealed. A sufficient thickness has been found to be approximately three hundred-thousandths of an inch, greater thicknesses however being ordinarily used. The thickness of the cuprous oxide deposits used in producing the patterns illustrated in the accompanying drawings were from six to fifteen hundred-thousandths of an inch.

The reduction of the cuprous oxide coating is done by hanging the article having the cuprous oxide coating thereon in a suitable hydrogen-evolving solution, connecting it as a cathode, and passing current through the solution. The reducing bath may be a solution of sodium carbonate, or of another alkaline compound of the kind ordinarily used for making up electrolytic cleaning baths.

The reduction of the reducible coatings may be carried out completely or only partly.

The patterns or designs which are produced can be considerably varied and controlled. I can vary and control their shape characteristics, their reflectivity characteristics and their tone characteristics. I effect this control in the preparation of the base-metal, in the thickness of the reducible coating, in the electrolytic reduction operation, and in operations on the reducible coating both prior and subsequent to the reduction operation.

The primary control of the size of the individual patterns is the thickness given to the reducible coating.

Controls for the shape characteristic of the patterns are:

*In the electrolytic reduction operation:* The voltage, other conditions being the same, at which the reduction is effected, affects the pattern shape and size.

The voltages, in regard to their effect, fall into four ranges or groups, which may be designated as a medium range, a sub-medium range, a low range, and a high range. Numerically, the voltages within these four ranges vary considerably with the temperature of the bath in which the reduction is carried on. In a cold reducing bath (60–70° F.) the medium range is quite wide, and the sub-medium and low ranges quite narrow. As the temperature increases, the medium range contracts, and the sub-medium and low ranges expand, through a considerable increase of temperature. After a considerable increase of temperature these three ranges again contract. The beginning of the high temperature range decreases progressively with increase of temperature, and the indication is that at temperatures approaching the boiling temperature, the effects on the reduction of the cuprous oxide for any voltage are those which characterize the high voltage range.

In a cold reducing bath (around 60–70° F.) I have found the medium range of voltage to be from about 4 to 16 or 18 volts; the sub-medium range to be from about 2½ to 4 volts; and the low range to be between about 2 volts and 2½ volts. The end points of the ranges are not sharp, so that in practice it is well to choose an operating voltage in an intermediate part of a range. The ranges should be technically established for the temperature at which reduction is carried out and for the voltage and composition of the bath used in depositing cuprous oxide.

Operating in the medium voltage range a cobweb crystal-like pattern is obtained. In a cold sodium carbonate solution such an effect was obtained at 5 to 8 volts.

In the sub-medium voltage range a peculiar sparkling crystal-like effect is obtained. In a cold sodium carbonate solution this effect was obtained at a voltage around three volts.

In the low voltage range a stippled or etched effect is obtained, together with more or less isolated crystals. In a cold sodium carbonate bath this effect was obtained at about 2 to 2½ volts.

In the high voltage range a moss or fern-like type of pattern is obtained. In a cold sodium carbonate solution, this effect was obtained at a voltage of 18 to 20 volts.

By differential reduction a pattern or design having two or more shape characteristics may be obtained. For example, reduction may be partially carried out under one set of conditions herein stated and then resumed under another set of conditions.

*In the preparation of the base metal:* By giving the base metal a scratch brush type of finish, putting the oxide coating thereon, and then electrolytically reducing the oxide coating at a voltage within the medium range, a papillary or mound-like appearance is favored. A buffed or highly polished surface on the base metal favors a cobweb crystal-like appearance of the coating subsequently applied thereto by putting on an oxide coating and electrolytically reducing it at voltages within the medium range.

*Operations on the surface of the reducible coating prior to the electrolytic reduction operation:* Rubbing a piece of cloth or the like, lightly over the surface of the reducible oxide coating, or daubing said surface with a sponge, or a mop of crushed cloth, paper, or the like, results in mottled or variegated designs on the electrolytically reduced coating. Marking the surface of the oxide coating with a stylus or other implement for producing a trace, results in a design following the trace. Letters, for example, which show in the subsequent electrolytically reduced coating may be produced in this way.

Dipping the article with the oxide coating in hot water results in a moss or fern-like type of design when the oxide coating is reduced.

*Operations on the reducible coating subsequent to the reduction operation:* By stopping the electrolytic reduction of the oxide coating at a point where it is complete at some parts of the coating and incomplete at other parts, and then subjecting the reduced and unreduced parts of the oxide coating to the differential action of a solvent or reagent, spotted effects are obtained. For example, by partially reducing a cuprous oxide coating on a brass, silver, etc., base, and then dissolving the unreduced cuprous oxide in a cyanide solution, a spotted effect is obtained having the contrasting appearance of brass and copper, silver and copper, etc.

Moreover, by an analagous procedure, that is, by stopping the electrolytic reduction of the oxide coating at a point where it is complete at some parts of the coating and incomplete at other parts, then placing the article in a bath for electrodepositing another metal, for example nickel, and passing a current, the other metal (nickel) will electrodeposit on the completely reduced parts of the oxide coating. Then subjecting the article to the action of a solvent or reagent for the oxide coating, the oxide will be dissolved, giving the article a spotted appearance, the spots being nickel, and the background being the surface of the base metal previously coated with the oxide coating.

Moreover, by applying a scratch brush to the oxide coating which has been completely reduced at some portions and incompletely reduced at others, and thereafter completing the reduction of the oxide, a matte surface is obtained with contrasting spots and background of different degrees of brightness.

Controls for the reflectivity characteristic of the patterns or designs are:

*In the reduction operation:* As heretofore described, by carrying out the electrolytic reduction of the oxide coating in the sub-medium voltage range a pattern or design is produced having a sparkling crystal character. By carrying out this electrolytic reduction in a warm alkaline solution, patterns or designs are obtained which not only sparkle, but also have an opalescence or iridescence.

Iridescence of the surface resulting from the reduction of the oxide is also favored by superimposing an alternating current ripple on the direct current which is used for reducing the oxide coating.

*In the preparation of the base metal:* By first depositing a thin coating of cuprous oxide on the order of a quarter of a hundred thousandth of an inch, reducing it, then depolarizing it, and then depositing thereon the oxide coating for producing patterns or designs by electrolytic reduction thereof, the brightness and distinctness of the pattern effects are improved.

*Operations on the reducible coating subsequent to the electrolytic reduction operation:* By covering the coatings having the patterns produced thereon in any of the ways herein described, by plates of other metals and non-metals, the reflectivity characteristics of such metals and non-metals may be obtained, with the pattern or design produced in the reduced coating, modified in many instances by the reflectivity characteristics of the reduced coating. For example, by depositing chromium, or nickel and chromium, on the reduced coating, a composite coating having the reflectivity characteristic of chromium plate (along with its other desirable features) and the pattern or design of the undercoating may be obtained. The attractiveness and variety of chromium finishes are greatly increased by depositing chromium upon the reduced coatings having patterns produced therein, thereby adding these values to the non-tarnishing and wear resisting properties of chromium plate. Nickel, copper, gold, black-nickel, molybdenum oxide, silver, tin and zinc are examples of other electrodeposits which may be plated on the reduced coating and the characteristics of these finishes with a pattern or design, obtained. Also by depositing cuprous oxide deposits as described in my Patent #2,081,121 on the reduced coatings having patterns produced therein, finishes having nearly all colors and shades of colors may be obtained.

A control for tone characteristic of the patterns or designs is:

*In operations on the reducible coating subsequent to the reduction operation:* A pronounced two-tone effect can be obtained by dipping articles, which have been coated with the oxide coating and then electrolytically reduced at voltages within the median range, in an acid dip, as a dilute solution of sulphuric acid. This two-tone effect is maintained when a thin coating of another metal, or a translucent coating exhibiting color by a light interference, as obtained by the method of my Patent 2,081,121 or by other methods, is applied directly to the aforesaid surface.

For the reducible oxide coating, an electrodeposit of cuprous oxide is advantageous. It may be readily and speedily produced in adequate and desired thicknesses. Evenness of thickness is also readily obtained. A method of electrodepositing cuprous oxide is disclosed in my Patent 2,081,121 and that method may be followed.

As heretofore stated, the copper oxide coating which is applied and subsequently reduced to form a pattern, has a thickness of about three hundred thousandths of an inch or more. Such a thickness is thicker than the cuprous oxide coatings which are applied for producing interference colors. In a hot bath the rate of deposition of the cuprous oxide is increased, and to decrease the time required to obtain the thickness of cuprous oxide required to produce patterns or designs by electrolytic reduction according to the present invention, the bath used may be heated.

The following is an example of the make-up composition of a bath which has been used for electrodepositing cuprous oxide coatings for producing patterns by reduction according to the present invention:

| | |
|---|---|
| Copper lactate, $Cu(C_3H_5O_3)_2$_____g./l__ | 80 |
| Sodium lactate, $Na(C_3H_5O_3)$—50% solution_____cc./l__ | 200 |
| Sodium carbonate, $Na_2CO_3$_____g./l__ | 20 |
| Sodium hydroxide, $NaOH$_____g./l__ | 30 |
| Stabilizer (aldol)_____g./l__ | ¼–1½ |

With the above bath, heated to a temperature of 110° F., using a cathode single electrode voltage of approximately 0.4 volt, or a voltage of about 0.5 volt across bus-bars spaced one foot apart, cuprous oxide having a thickness of three hundred thousandths of an inch may be obtained in about three minutes.

For practicing the electrolytic reduction according to the present invention I have used a water solution of sodium carbonate in which the concentration of sodium carbonate is about 4 ounces per gallon. The temperature for cold reduction was about 70° F. For obtaining opalescent or iridescent effects I have used a temperature of about 90° F.

With the alkaline reducing solution I have used voltages in the medium range of 5–8 volts at 70° F.; in the sub-medium range I have used about 3 volts at 90° F.; for the low range I have used about 2 volts at 90° F., and in the high range about 6 volts at 130° F. Electrolytic reduction is carried on until the appearance of the plate indicates complete reduction or the desired amount of reduction.

For depolarizing the coating resulting from the reduction of cuprous oxide I have used a cold (about 70° F.) sodium carbonate solution having a concentration of about four ounces per gallon of sodium carbonate, in which the article with the reduced cuprous oxide coating was suspended as an anode, and current at a voltage of about 1 to 2 volts was passed for about two minutes.

After removing the article from each of the baths, it is as usual, rinsed in water.

Patterns or designs produced according to the present invention are illustrated in the accompanying drawings, which are photographic reproductions of articles on which the pattern or designs have been produced. Most of the articles shown in the photographs have electrodeposited coatings over the reduced coating, and exhibit the design or pattern which has been produced in the reduced oxide undercoating.

The articles illustrated in the drawings are flanged oblong plaques having a slightly convex outer surface, made of brass and have coatings of various kinds produced in accordance with the present invention.

Referring to the examples of patterns or designs illustrated in the drawings;

Figure 1 illustrates a cobweb crystal type of pattern in which the crystal patterns have an average size of about ⅜ inch. This was produced by electrodepositing cuprous oxide on the buffed brass surface of the article for 15 seconds, reducing it to copper, depolarizing it, then electrodepositing cuprous oxide for 15 minutes, giving a cuprous oxide layer of about 15 hundred-thousandths of an inch thick. The cuprous oxide was then electrolytically reduced in a cold reducing bath at 6 volts (medium range) for about 15 minutes until the cuprous oxide was completely reduced to copper. The copper (reduced from the oxide) was then depolarized. There was then electrodeposited a two minute plate of copper, a two minute plate of nickel, and a three minute coat of chromium.

With a thicker cuprous oxide coating followed by electrolytic reduction, the average size of the crystal patterns would be larger, and with a thinner cuprous oxide coating the average size of the crystal patterns would be smaller.

Figure 2:

Figure 2 also illustrates a cobweb crystal type of pattern. The article here shown was produced in the same way as that shown in Figure 1, except that the brass surface of the article was scratch brushed before the cuprous oxide was deposited thereon, and the copper plate between the copper reduced from the oxide and the nickel plate was omitted.

Figure 3:
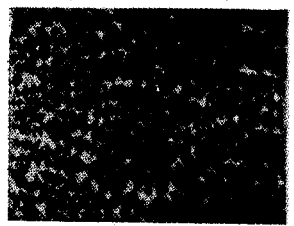

Figure 3 also illustrates a cobweb crystal type of pattern in which the average size of the crystal patterns is smaller than in Figure 1. The article shown in this view was produced in the same way as that shown in Figure 1 except that the second cuprous oxide coating which was reduced was thinner, the time of deposition being about 6 minutes.

Figure 4:
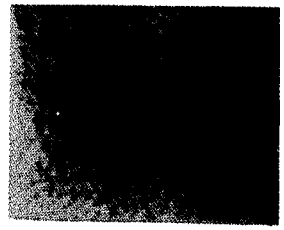

Figure 4 also illustrates a cobweb crystal type of pattern. The article shown in this view was produced in the same way as that shown in Figure 2, except that the second cuprous oxide coating was deposited for 6 minutes instead of 15 minutes.

Figure 5:
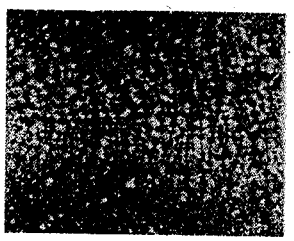

Figure 5 illustrates a sparkling crystal type of pattern. The article shown in this view was produced by electrodepositing copper on the brass article, buffing the copper, electrodepositing cuprous oxide for 15 seconds, reducing it to copper, depolarizing it, then electrodepositing cuprous oxide thereon for 6 minutes, giving a cuprous oxide layer of about 6 hundred-thousandths of an inch thick. The cuprous oxide was then electrolytically reduced in a reducing bath at 85° F. at 2½ volts (in the sub-medium range for this temperature) for about 8 minutes until the the cuprous oxide was completely reduced to copper. There was then electrodeposited for two minutes a plate of nickel followed by a three minute coat of chromium.

Figure 6:

Figure 6 also illustrates a sparkling crystal type of pattern. The article shown in this view was produced in the same way as that shown in Figure 5, except that the surface of the article was scratch-brushed before the first cuprous oxide coating was deposited thereon.

Figure 7:
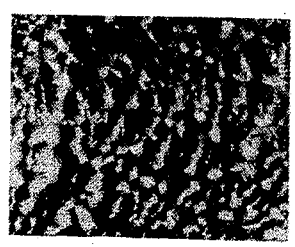

Figure 7 illustrates a stippled or etched type of pattern. The article here shown was produced by electrodepositing copper on the brass article, buffing the copper and electrodepositing cuprous oxide on the buffed surface of the copper for 7 minutes, giving a cuprous oxide layer of about 7 hundred-thousandths of an inch thick. The cuprous oxide was then electrolytically reduced in a heated reduction bath (90° F.) at 2.2 volts (in the low range at this temperature) for about 12 minutes until the cuprous oxide was completely reduced to copper. There was then electrodeposited for two minutes a plate of nickel followed by a three minute plate of chromium.

Figure 8:
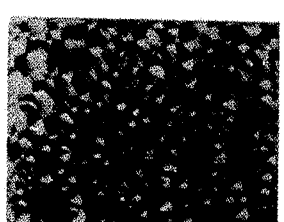

Figure 8 also illustrates a stippled or etched type of pattern. The article here shown was produced in the same way as that shown in Figure 7, except that the surface on which the cuprous oxide was deposited was scratch brushed before the cuprous oxide was deposited thereon.

Figure 9:

Figure 9 illustrates a moss or fern-like type of pattern. The article shown in this view was produced by electrodepositing cuprous oxide on the buffed brass surface of the article for 15 minutes, giving a cuprous oxide layer of about 15 hundred-thousandths of an inch thick. The cuprous oxide was then electrolytically reduced in a cold reducing bath at 18 volts (high voltage range) for about 2 minutes until the cuprous oxide was completely reduced in certain portions (the lighter appearing portions of the photographic reproduction) and incompletely reduced in other portions. The copper reduced from the oxide and the unreduced oxide were then depolarized. On this was deposited cuprous oxide of a thickness to exhibit by light interference the color yellow. The surface was then covered with a clear lacquer.

Figure 10:
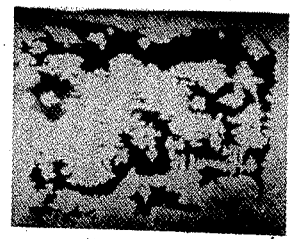

Figure 10 also illustrates a moss or fern-like type of pattern. The article shown in this view was produced in the same way as that shown in Figure 9, except that the electrolytic reduction of the cuprous oxide was carried out for a longer period (about 2½ minutes) and the surface of the article was scratch brushed after the reducing treatment and no cuprous oxide exhibiting color was deposited after the partial electrolytic reduction of the thick cuprous oxide layer.

Figure 11:

Figure 11 also illustrates a cobweb crystal type of pattern. The article here shown was produced in the same way as that shown in Figure 1, except that the copper reduced from the oxide was covered with a 2 minute electrodeposit of bright copper (instead of copper, nickel and chromium), and the surface then covered with a coating of a clear lacquer.

Figure 12:
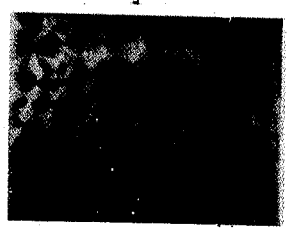

Figure 12 also illustrates a cobweb crystal type of pattern. The article shown in this view also was produced in the same way as that shown in Figure 1, except that the copper reduced from the oxide and exhibiting the pattern was covered with an electrodeposit of black nickel (instead of copper, nickel and chromium), and the surface then covered with a coating of a clear lacquer.

Figure 13:

Figure 13 also illustrates a cobweb crystal type of pattern. The article shown in this view was produced in the same way as that shown in Figure 1, except that the copper reduced from the oxide and exhibiting the pattern was covered with an electrodeposit of gold, instead of copper, nickel and chromium.

Figure 14:

Figure 14 illustrates a cobweb crystal type of pattern also having two-tone and papillary characteristics. The article shown in this view was produced in the same way as that shown in Figure 1, except that the copper reduced from the oxide and exhibiting the pattern had directly applied thereto a layer of cuprous oxide of a thickness which by light interference exhibits the color green. The article then had applied thereto a coating of clear lacquer.

Figure 15:

Figure 15 also illustrates a cobweb crystal type of pattern. The article shown in this view was produced in the same way as that shown in Figure 1, except that the surface of the copper reduced from the oxide, exhibiting the pattern, was covered by a thin layer of copper, and then cuprous oxide electrodeposited thereon of a thickness which by light interference exhibits the color blue. The surface of the article was then covered with a coating of clear lacquer. The copper layer immediately beneath the cuprous oxide layer which exhibits the blue color, was produced by electrodepositing a layer of cuprous oxide about two millionths of an inch thick, and electrolytically reducing it completely in a cold alkaline solution.

Figure 16:

Figure 16 also illustrates a cobweb crystal type of pattern. The article illustrated in this figure was produced in the same way as that shown in Figure 15, except that the copper layer reduced from the oxide and exhibiting the pattern was covered with bright copper plate, and the cuprous oxide layer which exhibits color was electrodeposited to a thickness which exhibits the red pigment color of the cuprous oxide.

Figure 17:

Figure 17 illustrates a cobweb crystal type of pattern also having pronounced two-tone and papillary characteristics. The article shown in this view was produced in the same way as that shown in Figure 1, except that the copper reduced from the oxide, exhibiting the pattern, appears just as it does following the reduction of the cuprous oxide. The only coating on the pattern-exhibiting copper surface is a clear lacquer.

Figure 18:
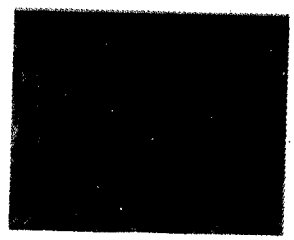

Figure 18 illustrates a cobweb crystal type of pattern also having two-tone and papillary characteristics. The article shown in this view was produced in the same way as that shown in Figure 1, except that, instead of the final copper, nickel and chromium coatings, the copper reduced from the cuprous oxide and exhibiting the pattern, was coated with a layer of cuprous oxide of a thickness which by light interference exhibits the color orange. Before electrodepositing the cuprous oxide layer which exhibits the color, the surface of the copper which has the pattern or design thereon was traced with a pencil to outline the letters "UCI." The surface of the cuprous oxide coating which exhibits color was covered with a coating of a clear lacquer.

Figure 19:

Figure 19 illustrates a type of pattern which was obtained by influencing the cuprous oxide layer prior to electrolytic reduction. The article shown in this view was obtained by electrodepositing a layer of cuprous oxide (having a thickness of about 8 hundred-thousandths of an inch) rubbing it in one direction with a towel, and then partially reducing the cuprous oxide to copper in a cold alkaline solution. On the surface of the reduced and partially reduced cuprous oxide, there was then electrodeposited a layer of cuprous oxide which exhibits, by light interference, the color orange, the effect on the eye is a blue color on the unreduced cuprous oxide and an orange-red color on the reduced portions. The article was then covered with a coating of a clear lacquer.

Figure 20:
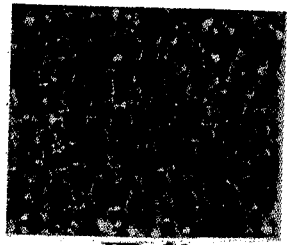

Figure 20 illustrates a mixed type of pattern. The article illustrated in this view was produced in the same way as that shown in Figure 1, except that the relatively thick cuprous oxide layer was first partially electrolytically reduced for three minutes in a cold alkaline solution at 6 volts (medium range). The voltage was then lowered to three volts (sub-medium voltage range) and the cuprous oxide further partially electrolytically reduced in the cold alkaline solution for six minutes. The voltage was then raised to six volts and the reduction continued until the cuprous oxide was completely reduced to copper.

Figure 21:
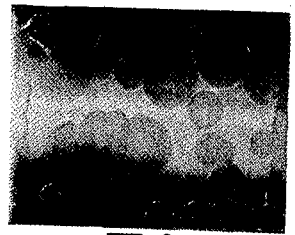

Figure 21 illustrates a spotted type of pattern. The article shown in this view was obtained by electrodepositing cuprous oxide on the buffed brass surface of the article for 15 minutes giving a cuprous oxide layer of about 15 hundred thousandths of an inch thick. The cuprous oxide layer was partially electrolytically reduced for about 10 minutes in a cold alkaline solution at 6 volts (medium range). The electrolytic reduction starts at points and extends radially. This gives complete reduction of the cuprous oxide in scattered areas, and unreduced cuprous oxide over other areas. The article with the scattered areas of reduced cuprous oxide was then dipped in a solution of sodium cyanide (about 2 ounces per gallon), and allowed to remain therein until all of the cuprous oxide was dissolved. The removal of the cuprous oxide is readily observed by lifting the article out of the bath from time to time and noting its complete disappearance. The area covered by the scattered areas of reduced copper appear as the darker spots on the photographic reproduction, and the lighter portions of the photographic reproduction are the surface of the polished brass from which the cuprous oxide was dissolved. After the cuprous oxide was dissolved, the article was coated with a clear lacquer.

Figure 22:
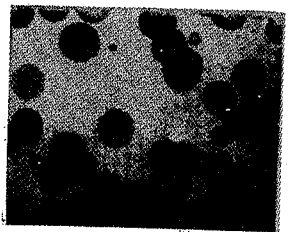

Figure 22 illustrates a spotted type of pattern. The article shown in this view was produced by electrodepositing cuprous oxide on the buffed brass surface of the article, of a thickness of about 15 hundred thousandths of an inch. The cuprous oxide layer was then partially electrolytically reduced in a cold alkaline solution at a voltage of about 6 volts. As previously described the reduction of cuprous oxide starts at scattered points and extends radially, leaving scattered areas of reduced copper, and the remainder of the area being the unreduced cuprous oxide. The electrolytic reduction was carried on for about 6 minutes, at which time the reduction of the cuprous oxide was incomplete. The surface of the article (cuprous oxide and copper reduced from the oxide) was then scratch brushed. After scratch brushing the article was then replaced in the cold alkaline bath, and the cuprous oxide completely reduced to copper. The article then had applied thereto a 2 minute coat of nickel and a 3 minute coat of chromium. The chromium surface has the color of chromium but has a spotted appearance by reason of the greater brightness of the spots at which the cuprous oxide had been reduced to copper prior to the scratch brushing.

Figure 23:
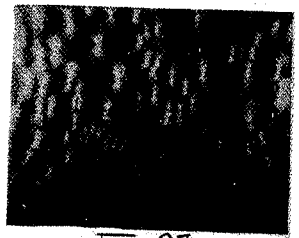

Figure 23 illustrates a distinct two-tone papillary type of pattern. The article shown in this view was produced in the same way as that shown in Figure 14, except the cuprous oxide layer which exhibits the pattern after being electrolytically reduced was then dipped for about 5 seconds in a 1% solution of sulphuric acid and then coated with cuprous oxide to a thickness which exhibits the color yellow by light interference. Thereafter the article was covered with a coat of clear lacquer.

The electrodeposition of the relatively thick layers of cuprous oxide which are electrolytically reduced to produce the patterns was carried out in a bath having the make-up composition of the example given in a fore part of the specification, which bath was heated to approximately 110° F., to reduce the time required for the electrodeposition of the cuprous oxide. In electrodepositing cuprous oxide for producing the cuprous oxide coatings in the interference range of colors, it is of advantage to use a plating bath which is much slower in operation than the bath used for electrodepositing the relatively thick cuprous oxide coating for pattern production. The temperature used for electrodepositng cuprous oxide of thicknesses in the interference range of colors was 70° F.

Under a high power microscope the surface of the copper reduced from the oxide and exhibiting the patterns is seen to be covered with fissures or cracks. These may be explained as being caused by strains in the cuprous oxide layer resulting from contraction of volume as the cuprous oxide is reduced to copper. The individuality of the patterns or types of patterns results from the manner in which the cracking starts and progresses under the various operating conditions of voltage, temperature, surface treatment, etc. hereinbefore stated, and also from the thickness and breakdown characteristics of the cuprous oxide layer from which the copper which exhibits the patterns is reduced. Over the surface of an article which has been treated according to the present method, or over areas thereof, there is a myriad of these fissures or cracks, which, when viewed by the unaided eye, appear as patterns.

The method according to the present invention can be carried out by various other modes of procedure than those herein specifically described, and products appealing to the esthetic sense embodying various combination effects other than those herein specifically illustrated and described may be produced according to the present method.

What is claimed is:

1. A method of producing decorative patterns or designs on articles, comprising forming a layer of cuprous oxide thereon of a thickness such that patterns resulting from myriad fissures occurring in the course of reduction of the oxide to metal are visible to the unaided eye, the minimum thickness being approximately three hundred-thousandths of an inch, and reducing said cuprous oxide producing in the course of redution myriad fissures which are visible as patterns when viewed by the unaided eye.

2. A method of producing decorative patterns or designs on articles, according to claim 1, wherein the reducing of the cuprous oxide is electrolytic.

3. A method of producing decorative patterns or designs on articles, comprising electrodepositing a cuprous oxide layer thereon of a thickness such that patterns resulting from myriad fissures therein produced by reduction of said cuprous oxide are visible to the unaided eye, the minimum thickness being approximately three hundred-thousandths of an inch and reducing said cuprous oxide so as to produce in the course of reduction the myriad fissures which are visible as patterns when viewed by the unaided eye.

4. A method of producing decorative patterns or designs on articles, according to claim 3, further comprising producing a mat finish on the surface on which any cuprous oxide layer is deposited.

5. A method of producing decorative patterns or designs on articles, according to claim 3, further comprising tracing the surface of the layer of cuprous oxide prior to complete reduction thereof so as to become a part of the pattern.

6. A method of producing decorative patterns or designs on articles according to claim 1, further comprising electrodepositing a coating on the pattern-exhibiting metal layer which results from reduction, of such a character that the visible pattern effect persists.

7. A method of producing decorative patterns or designs on articles, according to claim 3, further comprising electrodepositing a coating on the pattern-exhibiting metal layer which results from reduction, of such a character that the visible pattern effect persists.

8. A method of producing decorative patterns or designs on articles, according to claim 3, further including electrodepositing a thin layer of cuprous oxide on the order of a quarter of a hundred-thousandth of an inch on the article and reducing it, before electrodepositing the thicker cuprous oxide layer which when reduced exhibits the pattern or design.

9. A method of producing decorative patterns or designs on articles, according to claim 3, further comprising dipping the article in a dilute acid solution after the reduction of the cuprous oxide layer.

10. A decorated article of manufacture, exhibiting patterns or designs, comprising a layer of copper reduced from cuprous oxide having a minimum thickness of about three hundred-thousandths of an inch having a myriad of fissures or cracks, presenting to the unaided eye a combined effect having one or more of the following aspects: cobweb crystals, sparkling crystals, stippling, and moss or fern.

11. A decorated article of manufacture exhibiting patterns or designs, according to claim 10, wherein said pattern has in addition two distinct color tones.

12. A decorated article of manufacture, exhibiting patterns or designs, according to claim 10, further comprising an electrodeposited coating on the pattern-exhibiting metal layer, of such character that the visible pattern effect persists.

13. A method of producing decorative patterns or designs on articles, according to claim 1, wherein the cuprous oxide is electrolytically reduced at temperatures between 60° F. and 130° F. and at voltages starting at one and one-half volts, successively different types of patterns being produced at any fixed temperature within said range by increasing voltage, the first type starting at low voltage, being a stippled type, the second type, at higher voltages being a sparkling crystal-like type, the third, at still higher voltages, being a cobweb type, and the fourth at still higher voltages, being a moss type.

14. A method of producing decorative patterns or designs on articles, according to claim 3, wherein the cuprous oxide is electrolytically reduced at temperatures between 60° F. and 130° F. and at voltages starting at one and one-half volts, successively different types of patterns being produced at any fixed temperature within said range by increasing voltage, the first type starting at low voltage, being a stippled type, the second type, at higher voltage, being a sparkling crystal-like type, the third, at still higher voltages, being a cobweb type, and the fourth at still higher voltages, being a moss type.

JESSE E. STARECK.